(12) United States Patent
Agrawal et al.

(10) Patent No.: US 9,053,231 B2
(45) Date of Patent: Jun. 9, 2015

(54) SYSTEMS AND METHODS FOR ANALYZING OPERATIONS IN A MULTI-TENANT DATABASE SYSTEM ENVIRONMENT

(75) Inventors: Sonali Agrawal, San Carlos, CA (US); Walter Macklem, San Francisco, CA (US); Reena Mathew, San Francisco, CA (US); Simon Y. Wong, San Carlos, CA (US)

(73) Assignee: salesforce.com, inc., San Francisco, CA (US)

( * ) Notice: Subject to any disclaimer, the term of this patent is extended or adjusted under 35 U.S.C. 154(b) by 108 days.

(21) Appl. No.: 12/987,533

(22) Filed: Jan. 10, 2011

(65) Prior Publication Data

US 2011/0302212 A1 Dec. 8, 2011

Related U.S. Application Data

(60) Provisional application No. 61/352,280, filed on Jun. 7, 2010.

(51) Int. Cl.
*G06F 17/30* (2006.01)
*G06F 11/36* (2006.01)
*G06F 7/00* (2006.01)

(52) U.S. Cl.
CPC ...... *G06F 11/3636* (2013.01); *G06F 17/30371* (2013.01); *G06F 17/3051* (2013.01)

(58) Field of Classification Search
CPC .......... G06F 17/3051; G06F 17/30371; G06F 11/3636
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |

(Continued)

OTHER PUBLICATIONS

Salesforce.com, "The Force.com Multitenant Architecture, Understanding the Design of Salesforce.com's Internet Application Development Platform," Whitepaper, 2008, pp. 1-16.*

*Primary Examiner* — Jung Kim
*Assistant Examiner* — James J Wilcox
(74) *Attorney, Agent, or Firm* — Ingrassia Fisher & Lorenz, P.C.

(57) ABSTRACT

A system and method for analyzing operations in a multi-tenant database system environment is provided. The system may include a database storing tenant application data and common application data, the tenant application data and common application data controlling a creation, read, update, deletion or undeletion of an object in the multi-tenant database system environment. The system may further include a processor to analyze the tenant application data and common application data to identify therein where the object is being modified, and generate a report identifying potential errors or side effects which may affect the object based upon the analyzed tenant application data and common application data.

20 Claims, 4 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,868 B1 * | 3/2003 | Galeazzi et al. ............ 1/1 |
| 6,535,909 B1 | 3/2003 | Rust |
| 6,539,396 B1 * | 3/2003 | Bowman-Amuah .......... 707/769 |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,799,184 B2 * | 9/2004 | Bhatt et al. .................... 707/718 |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,127,461 B1 * | 10/2006 | Zhu et al. .................... 707/694 |
| 7,149,728 B1 * | 12/2006 | Feinberg et al. .................... 1/1 |
| 7,340,411 B2 | 3/2008 | Cook |
| 7,620,655 B2 | 11/2009 | Larsson et al. |
| 7,698,160 B2 | 4/2010 | Beaven et al. |
| 7,788,228 B2 * | 8/2010 | Feinberg et al. ............. 707/640 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,797,178 B2 * | 8/2014 | Kansal et al. ............ 340/870.07 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0181560 A1 * | 9/2004 | Romanufa et al. ............. 707/202 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0210909 A1 | 10/2004 | Dominquez, Jr. et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0039033 A1 * | 2/2005 | Meyers et al. ................. 713/193 |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0206834 A1 | 9/2006 | Fisher et al. |
| 2006/0235714 A1 * | 10/2006 | Adinolfi et al. .................... 705/1 |
| 2006/0235715 A1 * | 10/2006 | Abrams et al. .................... 705/1 |
| 2008/0162491 A1 * | 7/2008 | Becker et al. .................... 707/10 |
| 2008/0243867 A1 * | 10/2008 | Janedittakarn et al. .......... 707/10 |
| 2009/0282045 A1 * | 11/2009 | Hsieh et al. ....................... 707/9 |
| 2010/0106752 A1 * | 4/2010 | Eckardt et al. ................. 707/805 |
| 2010/0162231 A1 * | 6/2010 | Lanchares et al. ............. 717/177 |
| 2010/0306249 A1 * | 12/2010 | Hill et al. ....................... 707/769 |
| 2011/0252009 A1 * | 10/2011 | Simons et al. ................. 707/694 |

* cited by examiner

SYSTEMS AND METHODS FOR ANALYZING OPERATIONS IN A MULTI-TENANT DATABASE SYSTEM ENVIRONMENT

CROSS-REFERENCE TO RELATED APPLICATION(S)

This application claims the benefit of U.S. provisional patent application Ser. No. 61/352,280, filed Jun. 7, 2010, the entire content of which is incorporated by reference herein.

TECHNICAL FIELD

The following relates to data processing systems and processes, and more particularly relates to systems and processes for analyzing operations in a multi-tenant database system environment.

BACKGROUND

Modern software development is evolving away from the client-server model toward "cloud"-based processing systems that provide access to data and services via the Internet or other networks. In contrast to prior systems that hosted networked applications on dedicated server hardware, the cloud computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Although multi-tenant platforms can provide substantial benefits, they can be relatively difficult to design and develop. The often competing demands of integration and isolation between tenants, for example, can lead to any number of challenges in design and implementation. For example, while each tenant writes their own application code for their respective customer-developed application, the "cloud"-based processing system also contains application code which is universal to all of the tenants. Accordingly, it can be difficult at times to de-bug errors or determine a cause of a side-effect affecting a customer-developed application.

DESCRIPTION OF THE DRAWING FIGURES

Exemplary embodiments will hereinafter be described in conjunction with the following drawing figures, wherein like numerals denote like elements.

DETAILED DESCRIPTION

According to various exemplary embodiments, systems and methods are provided to analyze operations in a multi-tenant database system environment.

Figure 1:
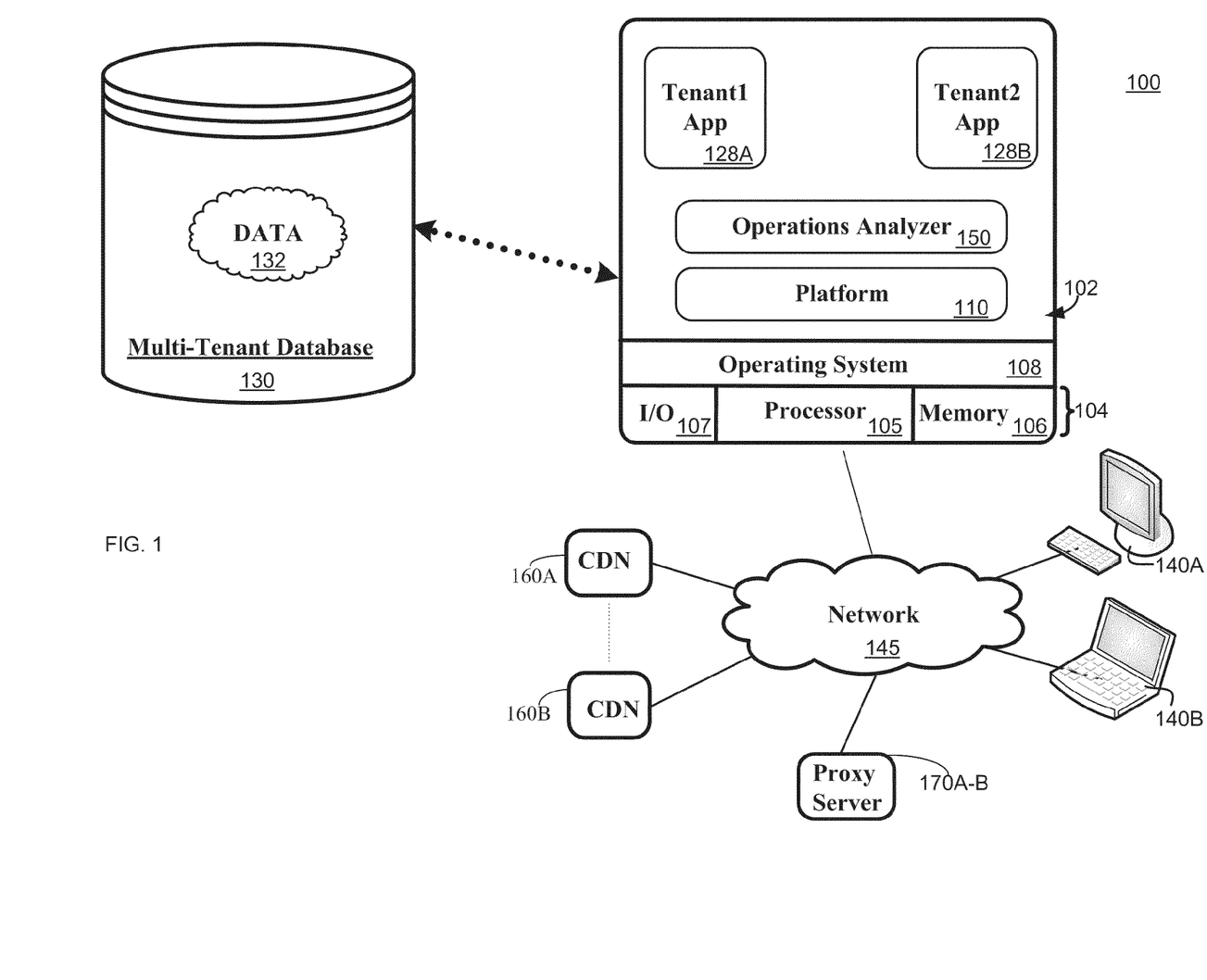
FIG. 1 is a block diagram of an exemplary multi-tenant data processing system.

Turning now to FIG. 1, an exemplary multi-tenant application system 100 suitably includes a server 102 that dynamically creates virtual applications 128A-B based upon data 132 from a common database 130 that is shared between multiple tenants. Data and services generated by the virtual applications 128A-B are provided via network 145 to any number of client devices 140A-B, as desired. Each virtual application 128A-B is suitably generated at run-time using a common platform 110 that securely provides access to data 132 in database 130 for each of the various tenants subscribing to system 100. The multi-tenant application system 100 may also include any number of content delivery networks ("CDNs") 160A-B, as desired. The CDNs 160A-B may contain a copy of at least some of the data 132 which may be accessible via the network 145. The multi-tenant application system 100 may also employ any number of proxy servers 170A-B which may be used to direct traffic between the server 102 and the CDNs 160A-B.

A "tenant" generally refers to a group of users that shares access to common data within database 130. Tenants may represent customers, customer departments, business or legal organizations, and/or any other entities that maintain data for particular sets of users within system 100. Although multiple tenants may share access to a common server 102 and database 130, the particular data and services provided from server 102 to each tenant can be securely isolated from those provided to other tenants, as described more fully below. However, the applications 128A-B, which are generally written by the customer, may also share common application data in the database 130. The multi-tenant architecture allows different sets of users to share functionality without necessarily sharing each other's data 132.

Database 130 is any sort of repository or other data storage system capable of storing and managing data 132 associated with any number of tenants. Database 130 may be implemented using conventional database server hardware. In various embodiments, database 130 shares processing hardware 104 with server 102. In other embodiments, database 130 is implemented using separate physical and/or virtual database server hardware that communicates with server 102 to perform the various functions described herein.

Server 102 is implemented using one or more actual and/or virtual computing systems that collectively provide a dynamic application platform 110 for generating virtual applications 128A-B. Server 102 operates conventional computing hardware 104, such as a processor 105, memory 106, input/output features 107 and the like. Processor 105 may be implemented using one or more of microprocessors, microcontrollers, processing cores and/or other computing resources spread across any number of distributed or integrated systems, including any number of "cloud-based" or other virtual systems. Memory 106 represents any non-transitory short or long term storage capable of storing programming instructions for execution on processor 105, including any sort of random access memory (RAM), read only memory (ROM), flash memory, magnetic or optical mass storage, and/or the like. Input/output features 107 represent conventional interfaces to networks (e.g., to network 145, or any other local area, wide area or other network), mass storage, display devices, data entry devices and/or the like. In a typical embodiment, application platform 110 gains access to processing resources, communications interfaces and other features of hardware 104 using any sort of conventional or proprietary operating system 108. As noted above, server 102 may be implemented using a cluster of actual and/or virtual servers operating in conjunction with each other, typically in association with conventional network communications, cluster management, load balancing and other features as appropriate.

The server 102 also includes an operations analyzer 150. The operations analyzer 150 analyzes objects that users may interact with in the multi-tenant database system 100 through client devices 140A-B. The objects may be, for example, one or more of the following: an account, an opportunity and a lead. User's of the system may also define custom objects that are specific to their own application. Each of the objects may have one or more data fields. Each instance of an object may be called a record. Further, each object may be represented by a table. The objects may be interacted with by a user, for example, by creating the object, reading the object, updating an existing object and deleting or undeleting an object. These operations may be referred to as "CRUD" operations (Create, Read, Update, Delete/undelete). The operations analyzer 150 generates a report detailing what is affecting the object in the system 100, as discussed in further detail below. In another embodiment the operations analyzer may be operable on the client devices 140A-B or on another server (not illustrated).

Figure 2:
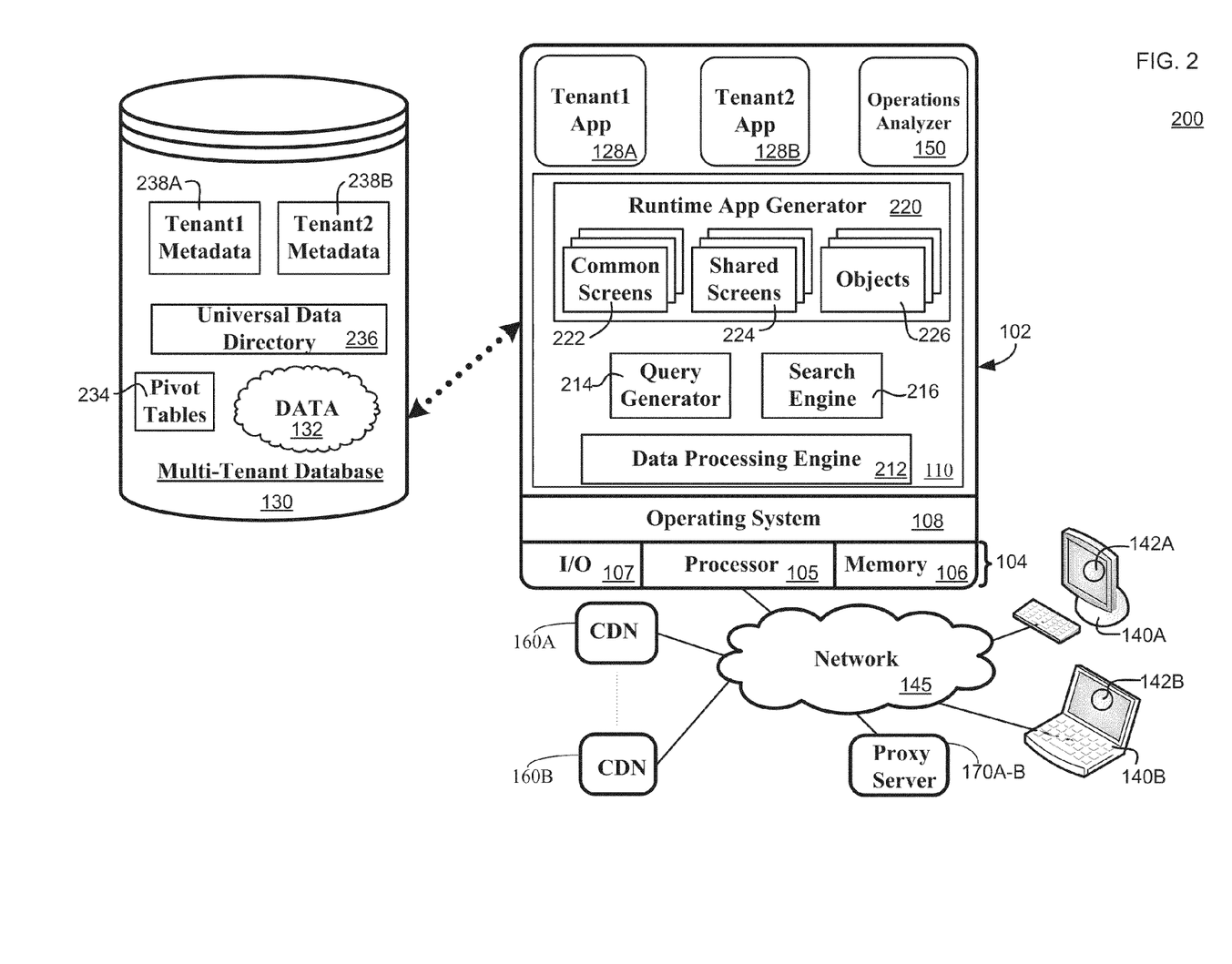
FIG. 2 is a block diagram of another exemplary multi-tenant data processing system.

FIG. 2 illustrates another exemplary multi-tenant application system 200 in accordance with an embodiment. The multi-tenant application system 200 includes client devices 140A-B, network 145, CDNs 160A-B and proxy servers 170A-B similar to those described above. The multi-tenant application system 200 further includes a server 102 that dynamically creates virtual applications 128A-B based upon data 132 from a common database 130 that is shared between multiple tenants. Data and services generated by the virtual applications 128A-B are provided via network 145 to any number of client devices 140A-B, as desired. Each virtual application 128A-B is suitably generated at run-time using a common platform 110 that securely provides access to data 132 in database 130 for each of the various tenants subscribing to system 100.

Data 132 may be organized and formatted in any manner to support multi-tenant application platform 110. In various embodiments, data 132 is suitably organized into a relatively small number of large data tables to maintain a semi-amorphous "heap"-type format. Data 132 can then be organized as needed for a particular virtual application 128A-B. In various embodiments, conventional data relationships are established using any number of pivot tables 234 that establish indexing, uniqueness, relationships between entities, and/or other aspects of conventional database organization as desired.

Further data manipulation and report formatting is generally performed at run-time using a variety of meta-data constructs. Metadata within a universal data directory (UDD) 236, for example, can be used to describe any number of forms, reports, workflows, user access privileges, business logic and other constructs that are common to multiple tenants. Tenant-specific formatting, functions and other constructs may be maintained as tenant-specific metadata 238A-B for each tenant, as desired. Rather than forcing data 132 into an inflexible global structure that is common to all tenants and applications, then, database 130 is organized to be relatively amorphous, with tables 234 and metadata 236-238 providing additional structure on an as-needed basis. To that end, application platform 110 suitably uses tables 234 and/or metadata 236, 238 to generate "virtual" components of applications 128A-B to logically obtain, process, and present the relatively amorphous data 132 from database 130.

Application platform 110 is any sort of software application or other data processing engine that generates virtual applications 128A-B that provide data and/or services to client devices 140A-B. Virtual applications 128A-B are typically generated at run-time in response to queries received from client devices 140A-B. In the example illustrated in FIG. 2, application platform 110 includes a bulk data processing engine 212, a query generator 214, a search engine 216 that provides text indexing and other search functionality, and a runtime application generator 220. Each of these features may be implemented as a separate process or other module, and many equivalent embodiments could include different and/or additional features, components or other modules as desired.

Runtime application generator 220 dynamically builds and executes virtual applications 128A-B in response to specific requests received from client devices 140A-B. Virtual applications 128A-B created by tenants are typically constructed in accordance with tenant-specific metadata 238, which describes the particular tables, reports, interfaces and/or other features of the particular application. In various embodiments, each virtual application 128A-B generates dynamic web content that can be served to a browser or other client program 142A-B associated with client device 140A-B, as appropriate.

Application generator 220 suitably interacts with query generator 214 to efficiently obtain multi-tenant data 132 from database 130 as needed. In a typical embodiment, query generator 214 considers the identity of the user requesting a particular function, and then builds and executes queries to database 130 using system-wide metadata 236, tenant specific metadata 238, pivot tables 234 and/or any other available resources. Query generator 214 in this example therefore maintains security of the multi-tenant database 130 by ensuring that queries are consistent with access privileges granted to the user that initiated the request.

Data processing engine 212 performs bulk processing operations on data 132 such as uploads or downloads, updates, online transaction processing and/or the like. In many embodiments, less urgent bulk processing of data 132 can be scheduled to occur as processing resources become available, thereby giving priority to more urgent data processing by query generator 214, search engine 216, virtual applications 128A-B and/or the like. Again, the various components, modules and inter-relationships of other application platforms 120 may vary from the particular examples described herein.

In operation, then, developers use application platform 110 to create data-driven virtual applications 128A-B for the tenants that they support. Such applications 128A-B may make use of interface features such as tenant-specific screens 224, universal screens 222 or the like. Any number of tenant-specific and/or universal objects 226 may also be available for integration into tenant-developed applications 128A-B. Data 132 associated with each application 128A-B is provided to database 130, as appropriate, and stored until requested, along with metadata 138 that describes the particular features (e.g., reports, tables, functions, etc.) of tenant-specific application 128A-B until needed.

Data and services provided by server 102 can be retrieved using any sort of personal computer, mobile telephone, tablet or other network-enabled client device 140 on network 145. Typically, the user operates a conventional browser or other client program 242 to contact server 102 via network 145 using, for example, the hypertext transport protocol (HTTP) or the like. The user typically authenticates his or her identity to the server 102 to obtain a session identification ("SessionID") that identifies the user in subsequent communications with server 102. When the identified user requests access to a virtual application 128A-B, application generator 220 suitably creates the application at run time based upon metadata 236 and 238, as appropriate. Query generator 214 suitably obtains the requested data 132 from database 130 as needed to populate the tables, reports or other features of virtual application 128A-B. As noted above, the virtual application 128A-B may contain Java, ActiveX or other content that can be presented using conventional client software 142A-B running on client device 140A-B; other embodiments may simply provide dynamic web or other content that can be presented and viewed by the user, as desired.

As discussed above, the server 102 includes an operations analyzer 150 which analyzes what affects an object in the system 100 and generates a report thereon. Each object, depending upon the CRUD operation being performed thereon, may be affected by multiple layers of the multi-tenant database system 100. Accordingly, when an error occurs during one of the CRUD operations, it can be difficult to identify the problem. Furthermore, when CRUD operations occur on the object various side-effects can occur which may be difficult to trace. Accordingly, the multi-tenant system 150 utilizes operations analyzer 150 to identify where within the multi-tenant database system 100 the object is affected.

For example, the operations analyzer 150 may evaluate customer written code that affects an object before the object is saved (i.e., pre-trigger) to the database 130. The code may be written by a customer, for example, in the Apex® programming language. The customer written code may, for example, validate the object, manipulate the object in some way or cancel the save operation. The customer written code may also make call-outs to other objects to be updated or deleted based upon pre-trigger customer written rules associated with a first object.

The operations analyzer 150 may also analyze system and custom validation rules or formula relating to the object before the object can be saved. System validation rules are rules that are universal to all of the tenants in the multi-tenant database system 100. In contrast, custom validation rules and formula are written by each tenant. An example of a system rule is that an end date for an action associated with an object can not be before a start date, or that a name associated with an object cannot be null. The validation rules or formula may also be based upon a status of an object. For example, the status may be "New," "Open," or "Closed." However, any status may be associated with each object. A rule based upon a status may be, for example, a status dependent validation rule which, for example, may require an opportunity (i.e., the object) to have a signed contract before the opportunity can be closed. Another status dependent action, for example, is that an object may not be able to be opened until an invoicing address has been provided.

The operations analyzer 150 can also evaluate dependent lookups or foreign key links where a first object may be dependent upon a second object before the first object can be saved. For example, if a user is attempting to add a line item (i.e., the first object) to an opportunity (i.e., the second object) the operations analyzer may evaluate a status of the opportunity. For example, the addition of the line item to the opportunity may depend upon whether the opportunity is an open opportunity.

The operations analyzer 150 also evaluates various assignment, workflow, escalation and system rules as in further detail below. These rules may cause an action to occur based upon data associated of the object after the object is saved. For example, a data field associated with the object may trigger an email message to be sent. The operations analyzer 150 evaluates the object to determine which rules are affecting the object. Accordingly, if an unexpected action is triggered, or if a user believed an action should have been triggered, the operations analyzer 150 can generate a report illustrating all of the various rules which are affecting the object so that the user can easily trace the source of the error.

As discussed above, the operations analyzer 150 may evaluate assignment rules. For example, if the object is a record of a sales opportunity the object may be assigned to a different sales representative depending upon a state of a field associated with the object. For example, the object may be assigned to different users based upon a geographical location or monetary value associated with the sales opportunity.

Workflow rules, similar to the assignment rules, may cause an object to be modified based upon a state of the object or a data field associated with the object. For example, after the object is saved, the workflow rules may look at a state or data field associated with the object, and based upon the state or data field trigger an update of the same state or data field or another state or data field associated with the present object or another object. Workflow rules may also trigger an action. For example, after the object is saved, the workflow rules may trigger an email, create an object within the system 100 or some other action based upon a state of the object or a data field associated with the object.

The operations analyzer 150 may also evaluate escalation rules associated with an object. For example, an object may have a deadline associated with it. The escalation rule may trigger email reminders as the deadline approaches. In another embodiment, if a condition is met a message may be sent to a superior. For example, if the user does not meet the deadline associated with an object a message may be sent to a manager of the user.

The operations analyzer 150 can also evaluate system defined rules which may be associated with an object. The system defined rules may be rules universal to all of the tenants of the multi-tenant database system 100. For example, the system rules may determine that a entered zip ode is in a proper format, that a billing zip code is in the billing state or that the state or country code is valid.

For each of the pre and post trigger events (i.e., pre save and post save), the operations analyzer 150 can also determine an amount of time or processing power used to perform the actions and generate a report thereon. Accordingly, the operations analyzer 150 can analyze the performance or efficiency of the CRUD operations.

In some instances the CRUD operations may trigger a recursive operation on an object. For example, a post-trigger rule may cause a field associated with an object to be updated. The updated field may cause another pre-trigger rule or a post-trigger rule, or multiple rules. Accordingly, in one embodiment, the operations analyzer 150 will also report when a recursive save of an identified object may occur and note which other objects may trigger a recursive save of the identified object.

Figure 3:
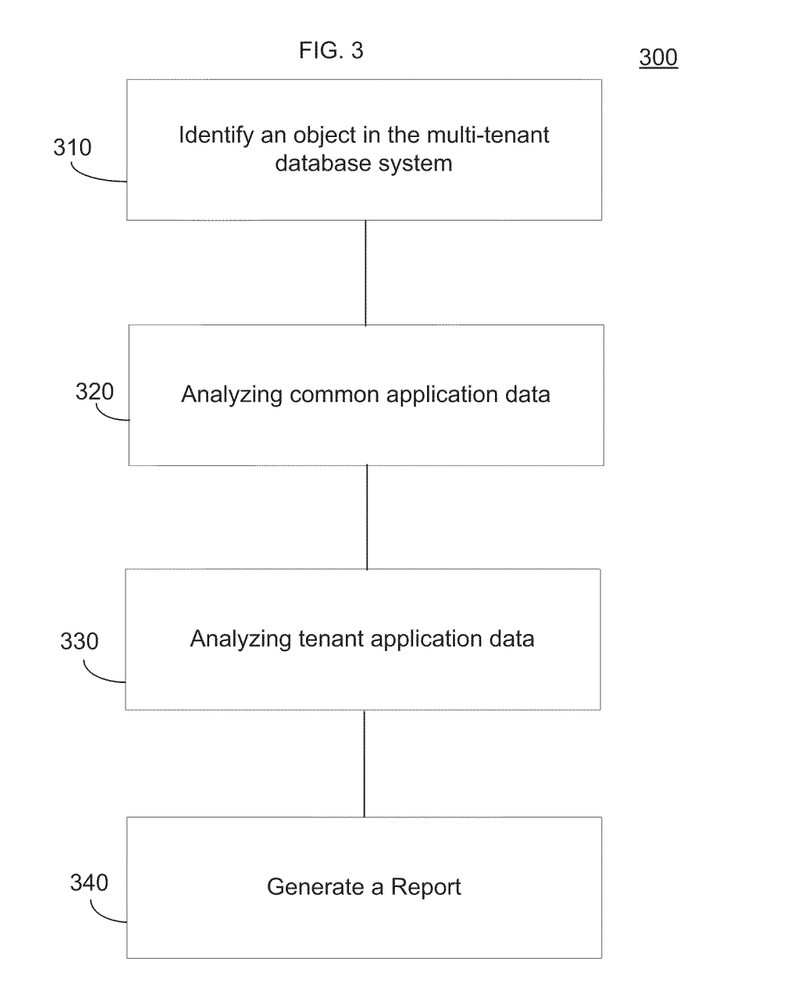
FIG. 3 is a flow chart illustrating an exemplary method of performing an operations analysis within the multi-tenant data processing system.

FIG. 3 is a flow chart illustrating an exemplary operation of the operations analyzer 150. The operations analyzer 150 first identifies an object of interest. (Step 310). In one embodiment, for example, an administrator of the system 100 may select which object to analyze through a user interface, as discussed in further detail below. The operations analyzer 150 may also identify which CRUD operation to look for with respect to the identified object. In one embodiment, for example, administrator of the system 100 may select which CRUD operation to look for through a user interface, as discussed in further detail below. The operations analyzer 150 may evaluate only one of the CRUD operations, any subset of the CRUD operations or all of the CRUD operations simultaneously. To evaluate where the identified object is affected by the selected CRUD operations, the operations analyzer 150 may parse and trace through the database 130. (Step 320 and 330). The operations analyzer 150 may parse and trace through tenant common and system wide application data (e.g., pivot table 234 and universal data directory 236 in Step 320) and tenant specific application data (e.g., tenant metadata 238A-B in Step 330). In one embodiment, for example, the tenant metadata may have backpointers to the objects they are applicable to. These "backpointers" can be a column on a table that defines the metadata, where the column stores the object type. In one embodiment, for example, the object type information may be represented directly in the code. When the code is saved to the system, the code is complied. While the code is being compiled, the code may be parsed to determine object types and store the object type information in a code table. The code table allows the object type to be queried without having to re-parse the code. The operations analyzer may then generate a report detailing how the object is affected by the CRUD operations. (Step 340). As discussed above, the CRUD operations may include pre and post trigger validation rules, workflow rules and recursive save operations.

Figure 4:
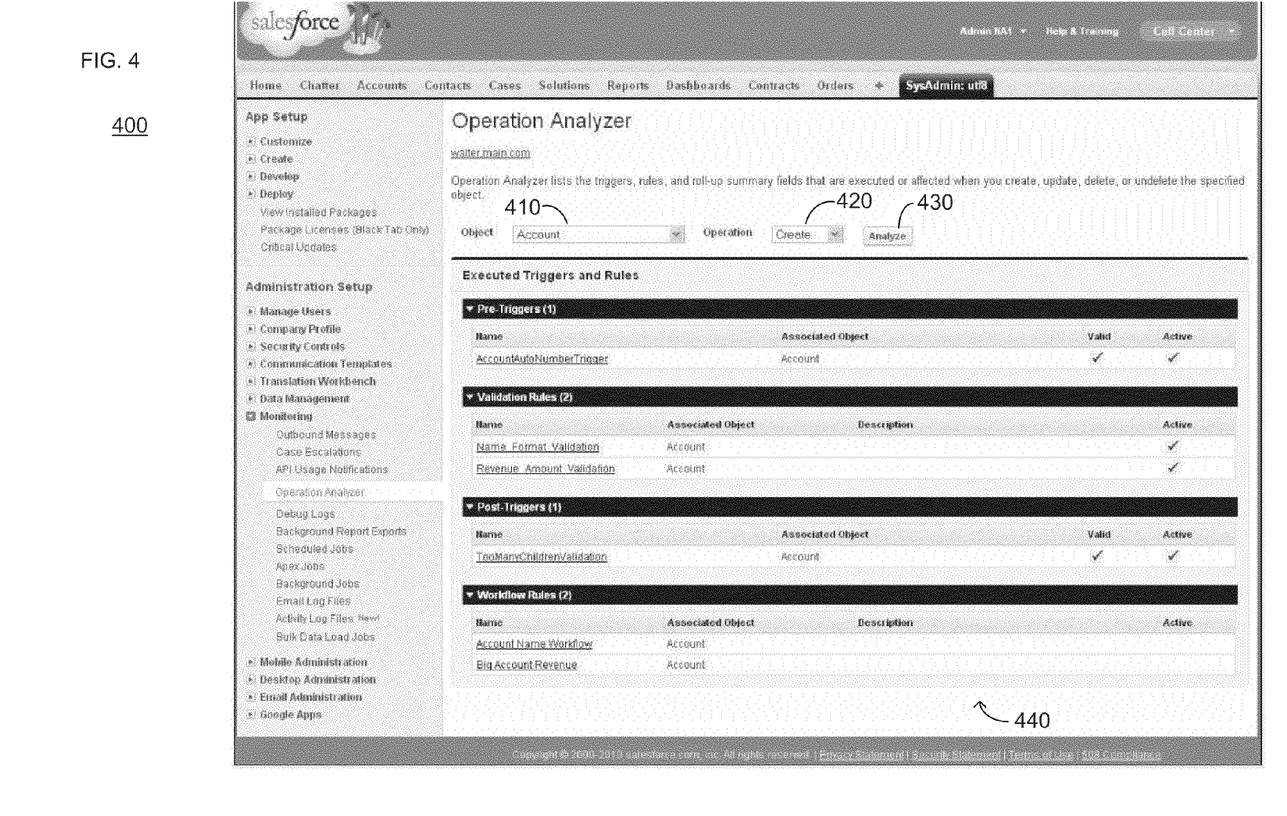
FIG. 4 is an exemplary user interface for performing an operations analysis within the multi-tenant data processing system.

FIG. 4 illustrates an exemplary user interface 400 for an operations analyzer 150. The user interface 400 includes an interface 410 for a user to select an object to perform the analysis thereon. The user interface 400 can also include an interface 420 for selecting a CRUD operation to analyze. As discussed above, any single CRUD operation or any combination of the CRUD operations may be selected to be analyzed. While the interfaces 410 and 420 illustrated in FIG. 4 are pull down menus, any other type of interface may be used. The user interface 400 may also include an interface 430 to initiate the operations analysis. Upon selection of the interface 430, the operations analyzer 150 generates a report 440 as discussed herein. The report 440 may be generated within the user interface 400, as illustrated in FIG. 4, or may be generated at a separate location. For example, the report 440 may be generated and save in the database 130 for later analysis.

Generally speaking, the various functions and features of method 300 may be carried out with any sort of hardware, software and/or firmware logic that is stored and/or executed on any platform. Some or all of method 300 may be carried out, for example, by logic executing within system 100 in FIG. 1. For example, various functions shown in FIG. 3 may be implemented using software or firmware logic that is stored in memory 106 and executed by processor 105 as part of application platform 110. The particular hardware, software and/or firmware logic that implements any of the various functions shown in FIG. 3, however, may vary from context to context, implementation to implementation, and embodiment to embodiment in accordance with the various features, structures and environments set forth herein. The particular means used to implement each of the various functions shown in FIG. 3, then, could be any sort of processing structures that are capable of executing software and/or firmware logic in any format, and/or any sort of application-specific or general purpose hardware, including any sort of discrete and/or integrated circuitry.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A system for analyzing operations in a multi-tenant database system environment, comprising:
   a database storing tenant application code, the tenant application code unique and accessible to only one of a plurality of tenants of the multi-tenant database system, and storing common application code, the common application code common and accessible to a plurality of tenants of the multi-tenant database system, the tenant application code and common application code both controlling a modification of an object in the multi-tenant database system environment; and
   a processor to:
      identify the object in the multi-tenant database system environment;
      tracing through the tenant application code to identify therein every instance where system rules modify the object before and after the object is saved,
      tracing through the common application code to identify therein every instance where tenant rules modify the object before and after the object is saved, and
      generate a debugging report identifying every instance in the tenant application code and the common application code where the object is being modified.

2. The system of claim 1, wherein the generated debugging report identifies a pre-trigger rule associated with the object.

3. The system of claim 2, wherein the pre-trigger rule is one of a customer written validation rule and a system validation rule which validates a data field associated with the object before the object is saved.

4. The system of claim 1, wherein the generated debugging report identifies a post-trigger rule associated with the object.

5. The system of claim 4, wherein the post-trigger rule is one of an assignment rule, a workflow rule and an escalation rule which causes an action after the object is saved.

6. The system of claim 5, wherein the action is an update to the object.

7. The system of claim 5, wherein the action is creation, read, update, deletion or undeletion of a second object.

8. The system of claim 1, wherein the generated debugging report identifies a recursive save of the object.

9. The system of claim 1, wherein the modification is one of a creation, read, update, deletion or undeletion operation on the object.

10. A method for analyzing operations in a multi-tenant database system environment by a processor, comprising:
    identifying, by the processor, an object in the multi-tenant database system environment;
    tracing through, by the processor, common application code, the common application code accessible to a plurality of tenants of the multi-tenant database system, to identify therein every instance where system rules modify the object before and after the object is saved;
    tracing through, by the processor, tenant application code, the tenant application code unique and accessible to only one specific tenant of the multi-tenant database system, to identify therein every instance where tenant rules modify the object before and after the object is saved; and
    generating, by the processor, a debugging report identifying every instance in the common application code and tenant application code where the object is being modified.

11. The method of claim 10, further comprising identifying a pre-trigger rule which validates a data field associated with the object before the object is saved.

12. The method of claim 11, further comprising identifying a post-trigger rule which causes an action after the object is saved.

13. The method of claim 12, wherein the action is an update to the object.

14. The method of claim 12, wherein the action is creation, read, update, deletion or undeletion of a second object.

15. The method of claim 12, further comprising determining a processing time associated with each pre-trigger rule and post trigger rule, wherein the generating a report further comprises reporting the determined processing time associated with each pre-trigger rule and post trigger rule.

16. The method of claim 10, further comprising identifying a recursive save of the object.

17. The method of claim 10, further comprising parsing the respective application code to identify to identify system and tenant rules which affect the object before and after the object is saved.

18. A user interface for visualizing create, read, update, delete and undelete ("CRUD") operations affecting an object in a multi-tenant database system environment, comprising:
a display, comprising:
an interface for selecting an object;
an interface for causing the generation of a debugging report identifying each instance in tenant application code unique and accessible to only one of a plurality of tenants of the multi-tenant database where system rules modify the object before and after the object is saved and for identifying each instance in common application code common and accessible to a plurality of tenants of the multi-tenant database system where system rules modify the object before and after the object is saved by tracing through both the tenant application code and common application code.

19. The user interface of claim 18, wherein the report provides a link to tenant specific code or tenant common code where the selected object is affected by the selected CRUD operation.

20. The user interface of claim 18, wherein the user interface is presented to an administrator of the multi-tenant database system.

* * * * *